United States Patent
Nakagawa et al.

(10) Patent No.: US 6,611,132 B2
(45) Date of Patent: Aug. 26, 2003

(54) DC-DC CONVERTER, POWER SUPPLY CIRCUIT, METHOD FOR CONTROLLING DC-DC CONVERTER, AND METHOD FOR CONTROLLING POWER SUPPLY CIRCUIT

(75) Inventors: Shinichi Nakagawa, Kasugai (JP); Hidenobu Ito, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/087,852

(22) Filed: Mar. 5, 2002

(65) Prior Publication Data
US 2002/0126512 A1 Sep. 12, 2002

(30) Foreign Application Priority Data

Mar. 7, 2001 (JP) .......................... 2001-063371
Nov. 28, 2001 (JP) .......................... 2001-362804

(51) Int. Cl.[7] ................................. G05F 1/40
(52) U.S. Cl. .................. 323/284; 323/274; 323/276
(58) Field of Search .................. 323/273, 274, 323/276, 282, 284

(56) References Cited

U.S. PATENT DOCUMENTS 5,721,483 A * 2/1998 Kolluri et al. .............. 323/222
6,087,816 A * 7/2000 Volk .......................... 323/222
6,229,289 B1 * 5/2001 Piovaccari et al. ......... 323/268
6,329,801 B1 * 12/2001 Zuniga et al. .............. 323/282

FOREIGN PATENT DOCUMENTS

JP          11-41825      2/1999       H02J/7/00
JP     2000-201473      7/2000      H02M/3/155

* cited by examiner

Primary Examiner—Bao Q. Vu
(74) Attorney, Agent, or Firm—Arent Fox Kintner Plotkin & Kahn, PLLC

(57) ABSTRACT

A DC-DC converter for decreasing power consumption and quickly increasing an output voltage. The converter includes a voltage generation circuit, a switching control circuit, a current detection circuit, and a step control circuit. An output transistor performs switching to generate the output voltage of the switching control circuit. The current detection circuit is connected to the voltage generation circuit to detect a load current, which is derived from the output voltage, and to generate a detection signal. A stop control circuit maintains the output transistor in an activated state in accordance with the detection signal and stops the operation of the switching control circuit when the load current is less than or equal to the load current.

19 Claims, 8 Drawing Sheets

DC-DC CONVERTER, POWER SUPPLY CIRCUIT, METHOD FOR CONTROLLING DC-DC CONVERTER, AND METHOD FOR CONTROLLING POWER SUPPLY CIRCUIT

BACKGROUND OF THE INVENTION

The present invention relates to a DC-DC converter, a power supply circuit, a method for controlling a DC-DC converter, and a method for controlling a power supply circuit.

Cellular phones have become compact. Power supply ICs used in power supply circuits of cellular phones thus have many outputs and are operated by low voltages. To prolong the life of batteries, the power consumption of the power supply circuits must be decreased.

Figure 1:
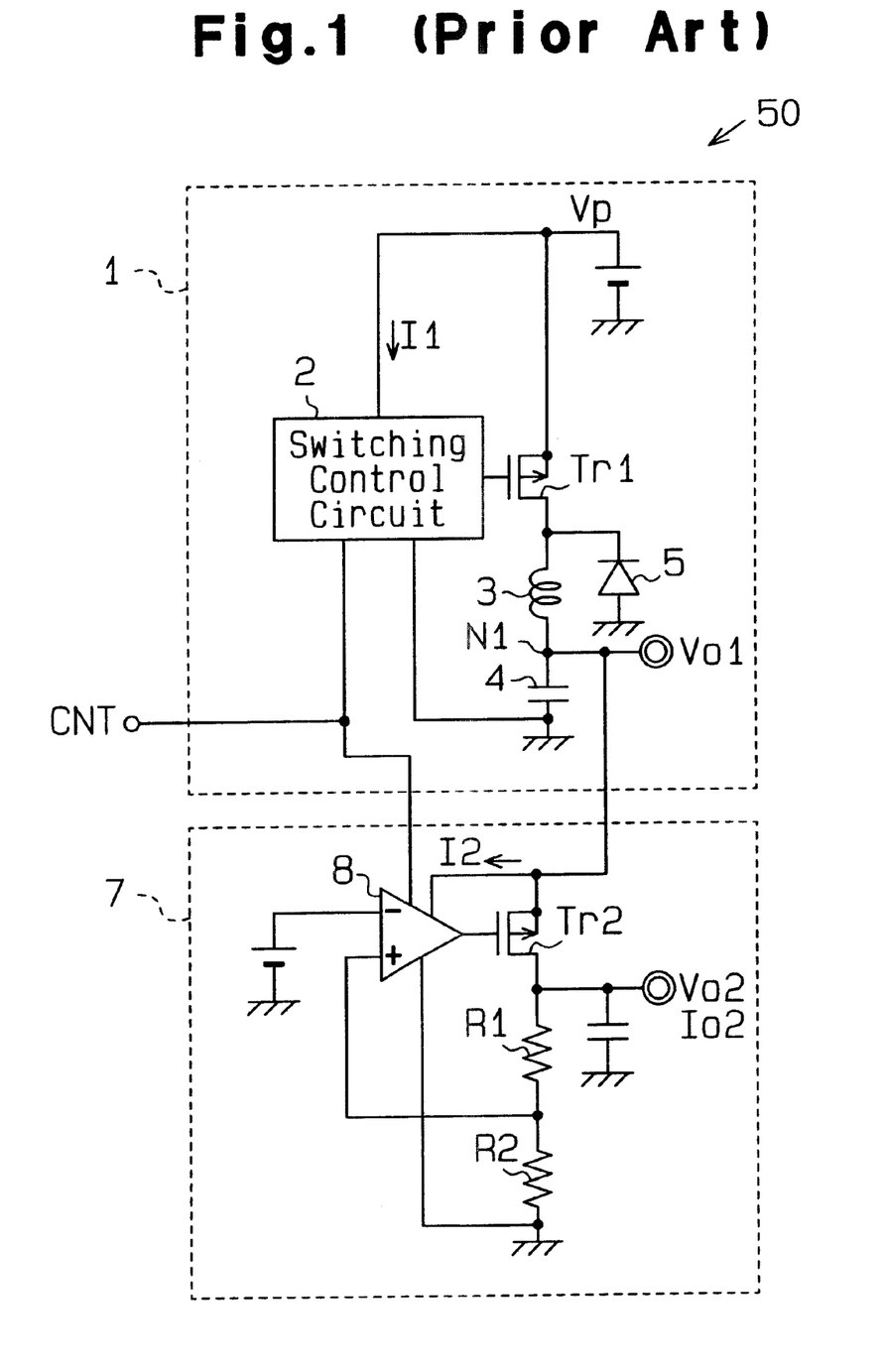
FIG. 1 is a schematic circuit diagram of a prior art power supply circuit.

FIG. 1 is a schematic circuit diagram of a prior art cellular phone power supply circuit 50. The power supply circuit 50 includes a DC-DC converter 1 and a low dropout (LDO) regulator 7.

In the DC-DC converter 1, a switching control circuit 2 controls the switching of a p-channel MOS transistor (first output transistor) Tr1. In the DC-DC converter 1, the switching of the first output transistor Tr1, an inductor 3, a capacitor 4, and a flyback diode 5 decrease a power supply voltage Vp to generate a first dropped voltage Vo1. A power supply terminal (not shown) of the LDO regulator 7 is supplied with the first output voltage Vo1 from a node N1 between the inductor 3 and the capacitor 4.

The LDO regulator 7 includes a p-channel MOS transistor (second output transistor) Tr2, which goes on in accordance with a comparison output signal of a comparator 8. In this state, the LDO regulator 7 decreases the first output voltage Vo1 to generate a second output (dropped) voltage Vo2. A load circuit (not shown) is supplied with the second output voltage Vo2.

The second output voltage Vo2 is divided by a first resistor R1 and a second resistor R2. The divided second output voltage Vo2 is provided to a plus input terminal of the comparator 8. An increase in the second output voltage Vo2 increases the comparison output signal of the comparator 8 and decreases an output (load) current Io2 of the second output transistor Tr2. A decrease in the second output voltage Vo2 decreases the comparison output signal of the comparator 8 and increases the output current Io2 of the second output transistor Tr2. Thus, the second output voltage Vo2 is maintained at a predetermined voltage, which is determined by the first and second resistors R1, R2.

The switching control circuit 2 and the comparator 8 receive a control signal CNT. The control signal CNT goes low when the load circuit, which receives the first and second output voltages Vo1, Vo2, enters a standby state. The low control signal CNT inactivates the switching control circuit 2 and the comparator 8 and causes the first and second output transistors Tr1, Tr2 to go off. This stops the supply of the first and second output voltages Vo1, Vo2.

Figure 6:
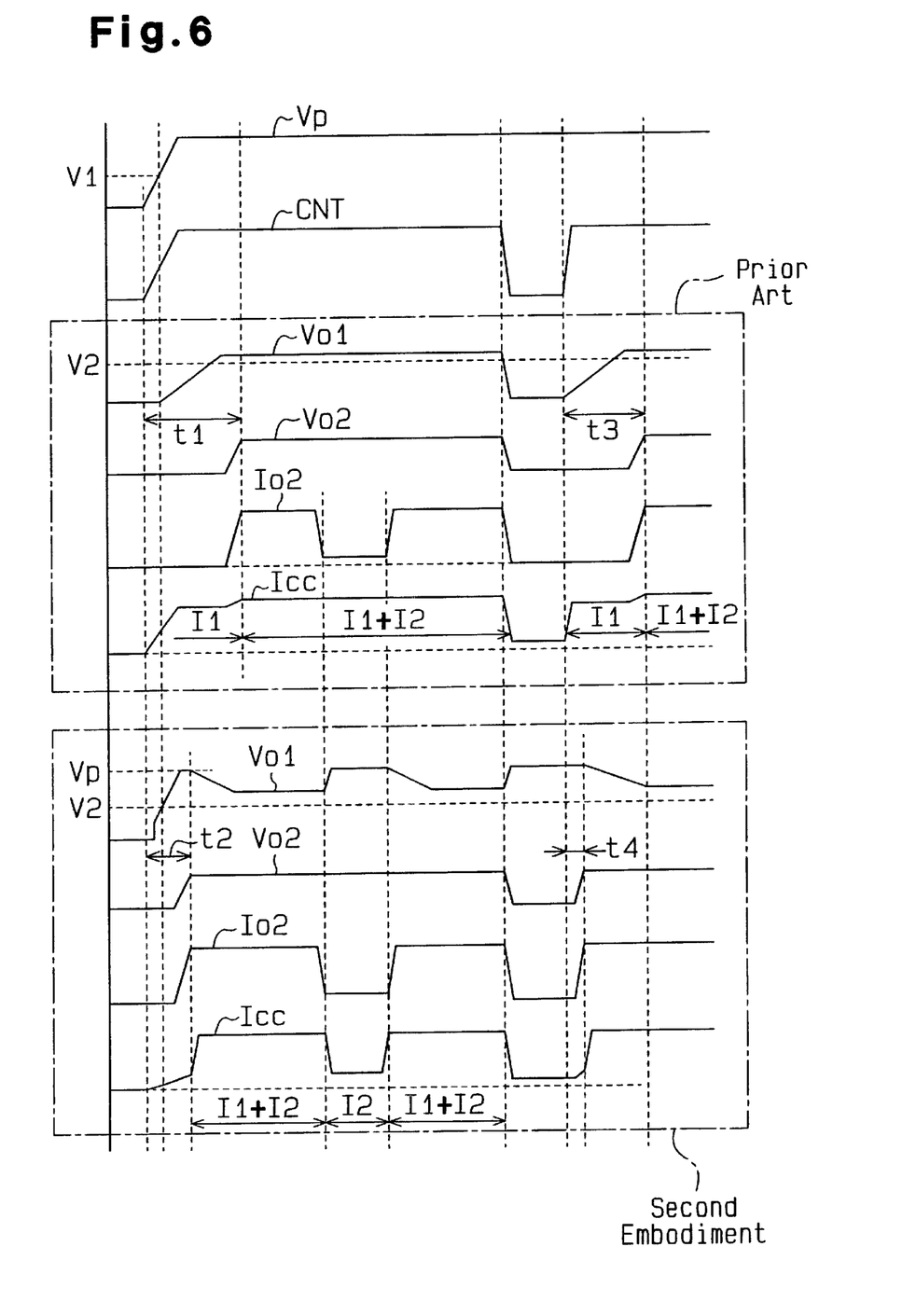
FIG. 6 is a waveform chart illustrating the operations of the prior art power supply circuit of FIG. 1 and the power supply circuit of FIG. 3.

The prior art portion of FIG. 6 illustrates the behavior of the second output voltage Vo2 when the power supply circuit 50 starts to receive power.

When a battery starts to supply power, the power supply voltage Vp supplied to the DC-DC converter 1 increases and the voltage of the control signal CNT increases synchronously with the power supply voltage Vp.

In the DC-DC converter 1, the operation of the switching control circuit 2 is stopped and the first output transistor Tr1 remains off until the power supply voltage Vp reaches a predetermined voltage V1. When the power supply voltage Vp increases to the predetermined voltage V1, the switching control circuit 2 starts to operate. This starts the switching of the first output transistor Tr1. In this state, the on time of the first output transistor Tr1 is controlled so that it gradually becomes longer to prevent problems caused by sudden increase of the first output voltage Vo1. Thus, the first output voltage Vo1 increases gradually. Subsequently, when the first output voltage Vo1 increases to a further predetermined voltage V2, the comparator 8 of the LDO regulator 7 starts to operate and increases the second output voltage.

In the power supply circuit 50, the switching control circuit 2 consumes consumption current I1 when the switching control circuit 2 starts to operate as the control signal CNT goes high, and the comparator 8 consumes consumption current I2 when the comparator 8 starts to operate.

The consumption currents I1, I2 are constant when the control signal CNT goes high and the first and second output voltages Vo1, Vo2 are output from the DC-DC converter 1 and the LDO regulator 7. Accordingly, as shown in the prior art portion of FIG. 6, the total current consumption (I1+I2) Icc of the switching control circuit 2 and the comparator 8 is constant regardless of the amount of the load current Io2 supplied to the load circuit by the LDO regulator 7.

Therefore, as the load current Io2 decreases, the ratio of the power consumed by the DC-DC converter 1 and the LDO regulator 7 increases. This decreases the efficiency of the power supply circuit 50.

Additionally, when the power supply circuit 50 starts to receive power, the first output voltage Vo1 increases gradually. This produces a relatively long delay time t1 from when the supply of power starts to when the second output voltage Vo2 increases to a predetermined level.

When the power supply circuit 50 is supplied with power, the first and second output transistors Tr1, Tr2 go off when the control signal CNT goes low. This decreases the first and second output voltages Vo1, Vo2. When the control signal CNT goes high again, the first output voltage Vo1 gradually increases. This produces a relatively long delay time t3 from when the control signal CNT goes high to when the second output voltage Vo2 increases to the predetermined level.

SUMMARY OF THE INVENTION

It is an object of the present invention to provide a DC-DC converter that decreases power consumption and quickly increases the output voltage.

To achieve the above object, the present invention provides a DC-DC converter including a voltage generation circuit for receiving a power supply voltage and generating an output voltage. The voltage generation circuit includes an output transistor for performing switching to generate the output voltage. A switching control circuit is connected to the voltage generation circuit to control the switching of the output transistor. A current detection circuit is connected to the voltage generation circuit to detect a load current derived from the output voltage of the voltage generation circuit to generate a detection signal. A stop control circuit is connected to the voltage generation circuit, the switching control circuit, and the current detection circuit to maintain the output transistor in an activated state in accordance with the detection signal and to stop the operation of the switching control circuit when the load current is less than or equal to a predetermined value.

A further perspective of the present invention is a power supply circuit including a DC-DC converter for receiving a power supply voltage and generating a first output voltage. The DC-DC converter includes a voltage generation circuit having a first output transistor. The first output transistor performs switching, and the voltage generating circuit generates the first output voltage in accordance with the switching of the first output transistor. A switching control circuit is connected to the voltage generation circuit to control the switching of the first output transistor. A voltage regulator is connected to the DC-DC converter to generate the second output voltage in accordance with the first output voltage. A current detection circuit detects a load current derived from the second output voltage of the voltage generation circuit to generate a first detection signal in accordance with the detected load current. A stop control circuit is connected to the voltage generation circuit, the switching control circuit, and the current detection circuit to maintain the output transistor in an activated state in accordance with the first detection signal and to stop the operation of the switching control circuit when the load current is less than or equal to a predetermined value.

A further perspective of the present invention is a method for controlling a DC-DC converter. The DC-DC converter includes an output transistor for performing switching to generate an output voltage and a switching control circuit connected to the voltage generation circuit for controlling the switching of the output transistor. The method includes supplying a load with a load current derived from the output voltage of the output transistor, detecting the load current, determining whether the load current is less than or equal to a predetermined value, maintaining the output transistor in an activated state when the load current is determined as being less than or equal to the predetermined value, and stopping the operation of the switching control circuit when the load current is determined as being less than or equal to the predetermined value.

A further perspective of the present invention is a method for controlling a power supply circuit. The power supply circuit includes a DC-DC converter having an output transistor for performing switching to generate a first output voltage and a switching control circuit for controlling the switching of the output transistor. A voltage regulator is connected to the DC-DC converter to generate a second output voltage in accordance with the first output voltage. The method includes supplying a load with a load current derived from the second output voltage, detecting the load current, determining whether the load current is less than or equal to a predetermined value, maintaining the output transistor in an activated state when the load current is determined as being less than or equal to the predetermined value, and stopping the operation of the switching control circuit when the load current is determined as being less than or equal to the predetermined value.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

In the drawings, like numerals are used for like elements throughout.

[First Embodiment]

Figure 2:
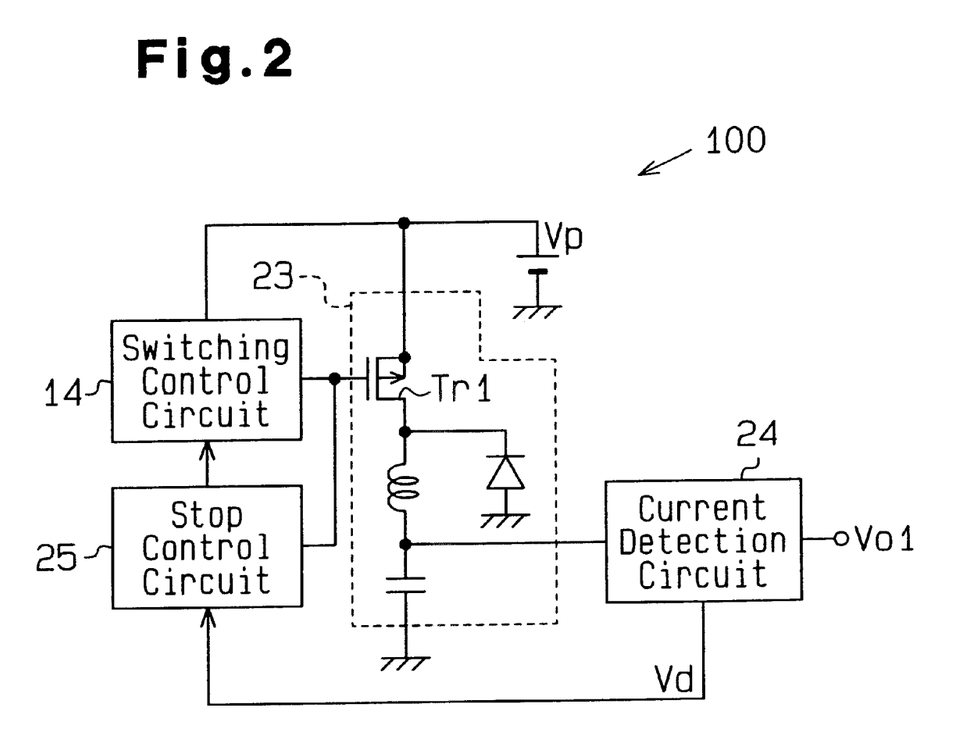
FIG. 2 is a schematic circuit diagram of a DC-DC converter according to a first embodiment of the present invention.

FIG. 2 is a schematic circuit diagram of a DC-DC converter 100 according to a first embodiment of the present invention. The DC-DC converter 100 includes a voltage generation circuit 23, a switching control circuit 14, a current detection circuit 24, and a stop control circuit 25. The voltage generation circuit 23 includes an output transistor Tr1. In accordance with the switching of the output transistor Tr1, the DC-DC converter 100 generates an output voltage Vo1, which differs from a power supply voltage Vp.

The switching control circuit 14 controls the switching of the output transistor Tr1. The current detection circuit 24 detects a load current output from the voltage generation circuit 23 and generates a detection signal Vd. When the load current is less than or equal to a predetermined value, the stop control circuit 25 keeps the output transistor Tr1 on in accordance with the detection signal Vd and stops the operation of the switching control circuit 14.

Therefore, when the DC-DC converter 100 starts to receive power, the output transistor Tr1 remains on, and the output voltage Vo1 of the DC-DC converter 100 increases substantially at the same time as when the power supply voltage Vp increases. This quickly increases the output voltage Vo1.

[Second Embodiment]

Figure 3:
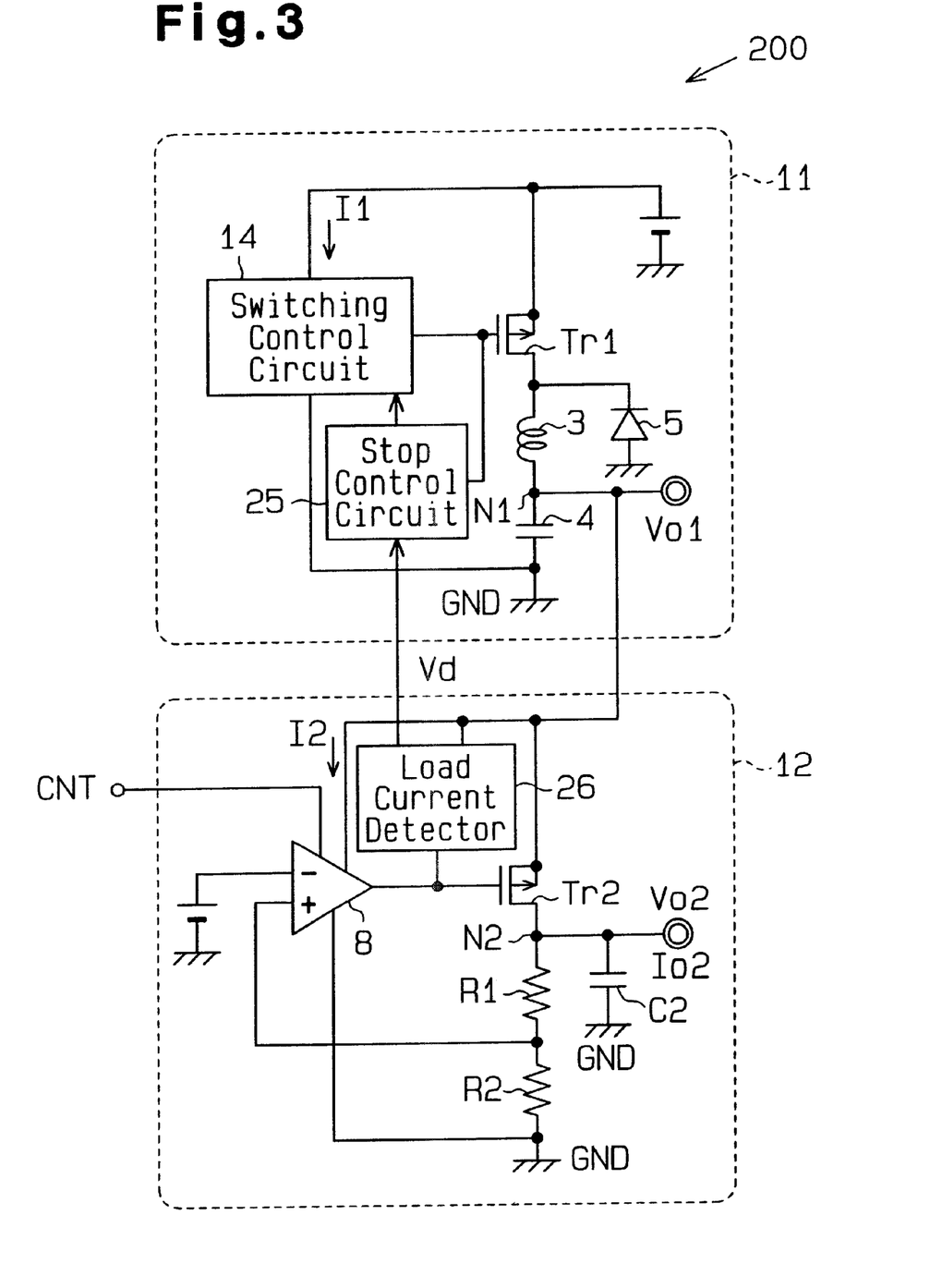
FIG. 3 is a schematic circuit diagram of a power supply circuit according to a second embodiment of the present invention.

FIG. 3 is a schematic circuit diagram of a power supply circuit 200 according to a second embodiment of the present invention. The power supply circuit 200 includes a switching control circuit 14, a stop control circuit 25, a first output transistor Tr1, an inductor 3, a capacitor 4, and a flyback diode 5. A first output voltage Vo1 generated from the DC-DC converter 11 is supplied as a power supply voltage to the LDO regulator 12 from a node N1 between the inductor 3 and the capacitor 4.

The LDO regulator 12 includes a comparator 8, a second output transistor Tr2, first and second resistors R1, R2, and a load current detector 26. A second output voltage Vo2, which is generated from the LDO regulator 12, is output from a node N2 between the second output transistor Tr2 and the first resistor R1. A capacitor C2, which is connected between the node N2 and the ground GND, smoothens the second output voltage Vo2.

When the load current detector 26 detects a load current Io2, the load current detector 26 generates a first detection signal Vd in accordance with the current value of the load current Io2 and provides the first detection signal Vd to the stop control circuit 25 of the DC-DC converter 11.

The comparator 8 receives a control signal CNT at a low level when in a standby state. The low control signal CNT causes the second output transistor Tr2 to go off. This shifts the second output voltage Vo2 to a ground (GND) level.

Figure 4:
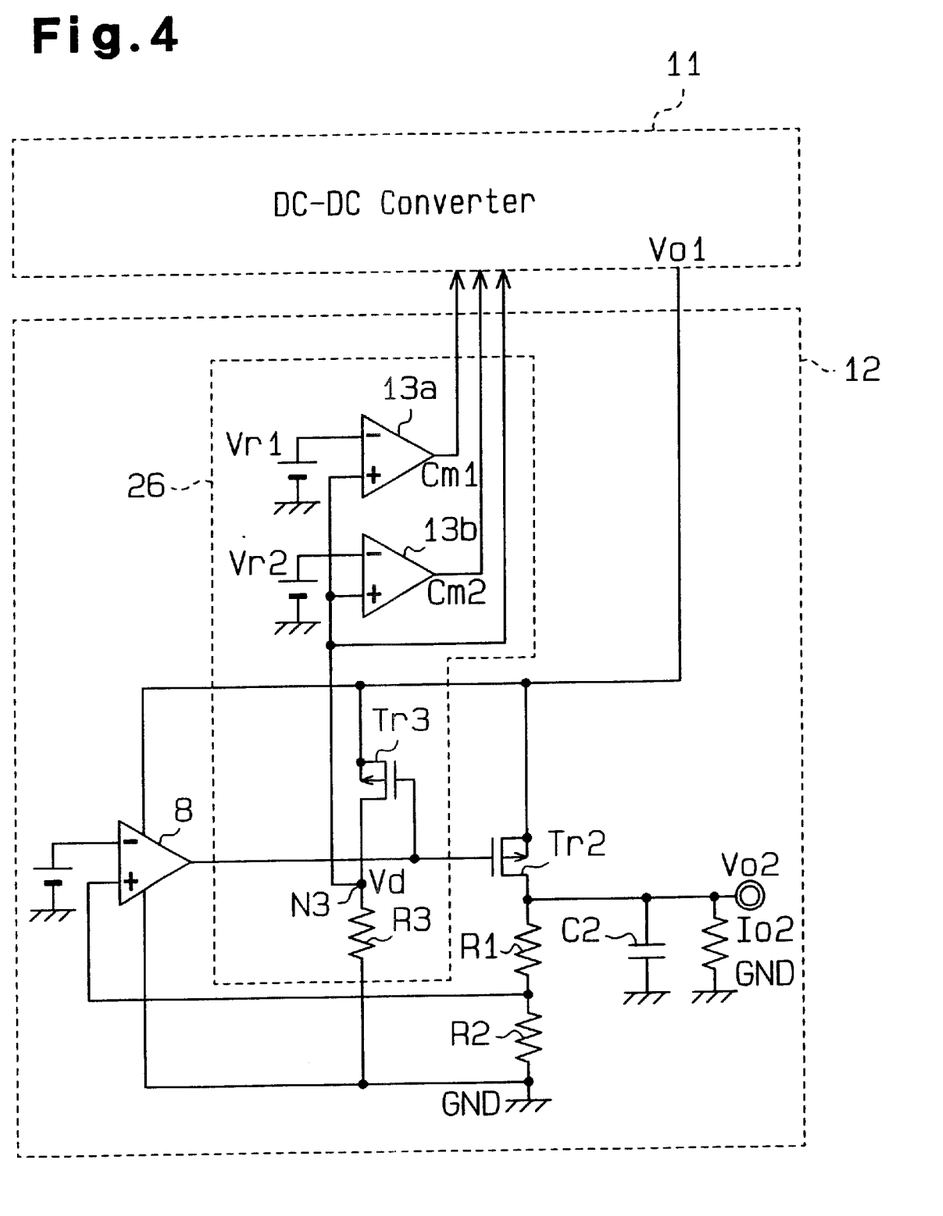
FIG. 4 is a circuit diagram of a load current detector and an LDO regulator used in the power supply circuit of FIG. 3.

FIG. 4 is a schematic circuit diagram of the LDO regulator 12 and the load current detector 26. The load current detector 26 includes first and second comparators 13a, 13b, a p-channel MOS transistor (third transistor) Tr3, and a third resistor R3.

The comparator 8 generates a comparison output signal, which is provided to the gate of the third transistor (current detection transistor) Tr3. The source of the third transistor Tr3 is supplied with the first output voltage Vo1. The drain of the third transistor Tr3 is connected to the ground GND by way of the third resistor R3.

The potential at the gate of the third transistor Tr3 is equal to the potential at the gate of the second output transistor Tr2. Thus, the second and third transistors Tr2, Tr3 function as a current mirror.

A drain voltage (first detection signal) Vd of the transistor Tr3 increases when the load current Io2 increases and decreases when the load current Io2 decreases. The drain voltage Vd is provided from a node N3, between the drain of the third transistor Tr3 and the third resistor R3, to the plus input terminals of the first and second comparators 13a, 13b and to the DC-DC converter 11.

The first comparator 13a compares the drain voltage Vd and a first reference voltage Vr1 to generate a first comparison signal Cm1 based on the comparison. The first comparison signal Cm1 is provided to the DC-DC converter 11. The second comparator 13b compares the drain voltage Vd with a second reference voltage Vr2 to generate a second comparison signal Cm2 based on the comparison. The second comparison signal Cm2 is provided to the DC-DC converter 11. The first reference voltage Vr1 is greater than the second reference voltage Vr2.

Figure 5:
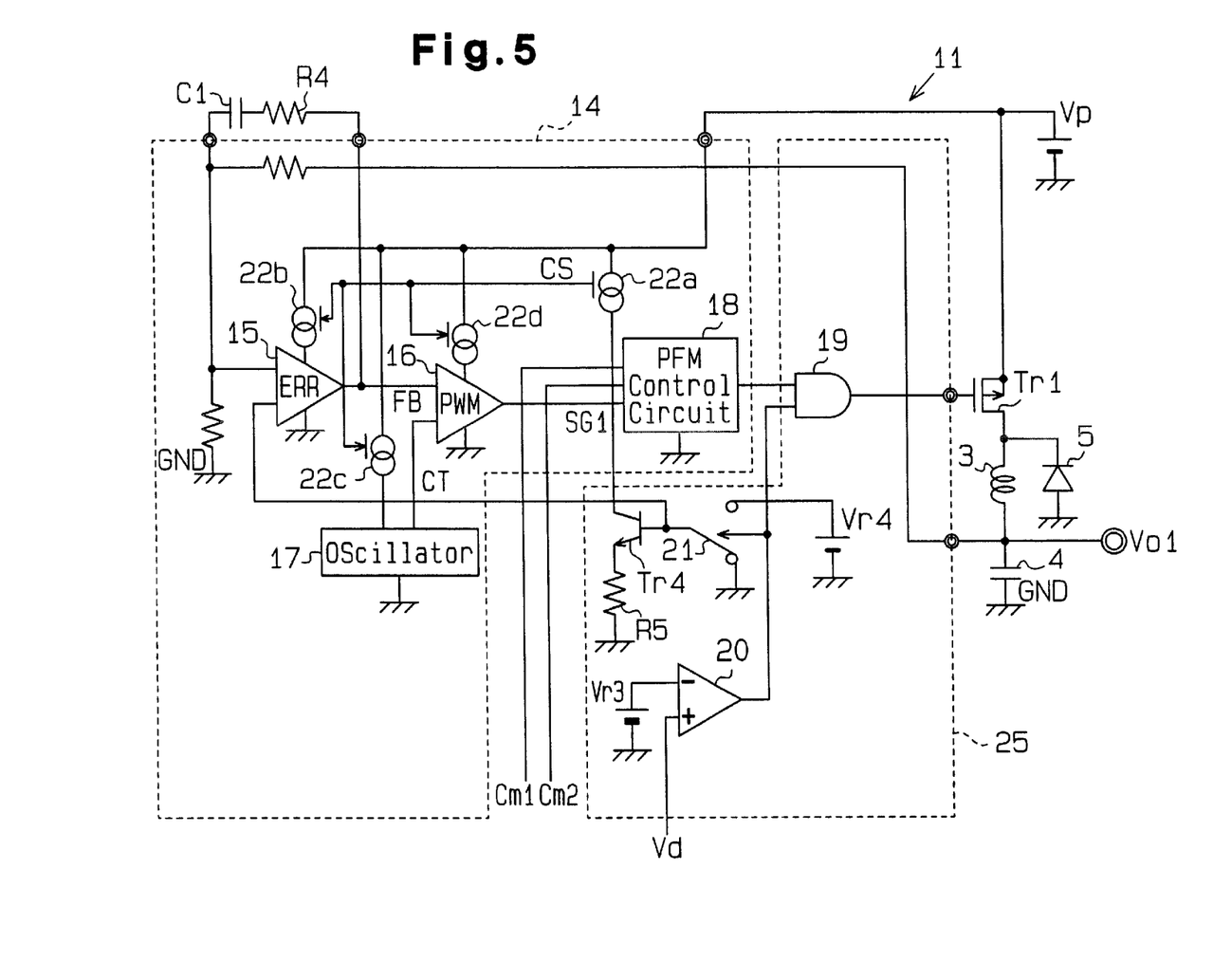
FIG. 5 is a schematic circuit diagram of a DC-DC converter used in the power supply circuit of FIG. 3.

FIG. 5 is a schematic circuit diagram of the DC-DC converter 11. As shown in FIG. 5, the switching control circuit 14 includes an error detection amplifier 15, a PWM comparator 16, an oscillator 17, a main current source circuit 22a, and first to third current source circuits 22b–22d. The stop control circuit 25 includes an AND circuit (gate control circuit) 19, a disconnection control comparator (control comparator) 20, a switch circuit 21, and a fourth transistor Tr4.

The error detection amplifier 15 of the switching control circuit 14 receives the first output voltage Vo1 and generates a DC voltage (error amplification signal) FB. The DC current voltage FB is supplied to the PWM comparator 16. A capacitor C1 and a resistor R4, which function to correct phases, are connected in series between the input and output terminals of the error detection amplifier 15. The connection of the capacitor C1 and the resistor R4 may be reversed.

The PWM comparator 16 receives a triangular or sawtooth wave signal CT, which has a predetermined frequency, from the oscillator 17 and compares the signal CT with the DC voltage FB. Then, the PWM comparator 16 generates a pulse signal SG1, which has a predetermined frequency, and provides the pulse signal SG1 to a PFM control circuit 18. The duty ratio of the pulse signal SG1 varies in accordance with the DC voltage FB.

The PFM control circuit 18 receives the first and second comparison signals CM1, Cm2 respectively from the first and second comparators 13a, 13b and controls the frequency of the pulse signal SG1 in accordance with the first and second comparison signals Cm1, Cm2. The frequency-controlled pulse signal SG1 is provided to the AND circuit 19.

An increase or decrease in the drain voltage Vd due to a change in the load current of the LDO regulator 12 results in one of three combinations of the levels of the first and second comparison signals. The PFM control circuit 18 varies the frequency of the pulse signal in accordance with the combination. The PFM control circuit 18, for example, increases the frequency of the pulse signal SG1 as the drain voltage Vd increases.

The drain voltage Vd is supplied to the plus input terminal of the control comparator 20 in the DC-DC converter 11. The minus input terminal of the control comparator 20 is supplied with a third reference voltage Vr3, which is lower than the second reference voltage Vr2.

The control comparator 20 generates a disconnection comparison signal at a low level when the drain voltage Vd is lower than the third reference voltage Vr3 and provides the low disconnection comparison signal to the AND circuit 19. The AND circuit 19 generates an AND output signal, which is provided to the gate of the first output transistor Tr1.

The disconnection comparison signal is provided to the switch circuit 21. When the disconnection comparison signal is low, the switch circuit 21 connects an NPN transistor (fourth transistor) Tr4 to the ground GND. When the disconnection comparison signal is high, the switch circuit 21 provides the base of the fourth transistor Tr4 with a fourth reference voltage Vr4.

The collector of the fourth transistor Tr4 receives a collector current from a power supply via the current source circuit 22a. The emitter of the fourth transistor Tr4 is connected to the ground GND via a resistor R5. When the base of the fourth transistor Tr4 is supplied with the fourth reference voltage Vr4, the fourth transistor tr4 goes on and the collector current flows out of the current source circuit 22a. When the base of the fourth transistor Tr4 is connected to the ground GND, the fourth transistor Tr4 goes off.

The error detection amplifier 15, the PWM comparator 16, and the oscillator 17 are respectively supplied with an operational current via the first to third current source circuits 22b–22d. The main current source circuit 22a provides the first to third current source circuits 22b–22d with a current source control signal CS. When the main current source circuit 22a supplies the collector current with the fourth transistor Tr4, the current source control signal CS activates the first to third current source circuits 22b–22d.

The operation of the power supply circuit 200 will now be discussed. When the power supply circuit 200 is supplied with power, the drain voltage Vd is equal to the ground level. Thus, the disconnection comparison signal of the control comparator 20 is low, and the AND output signal of the AND circuit 19 is low. In this state, the first output transistor Tr1 remains on, and, with reference to FIG. 6, the first output voltage Vo1 increases suddenly slightly after the power starts to increase. The first output voltage Vo1 then increases synchronously with the power at the same rate as when the power supply circuit 200 starts to receive power.

Subsequently, as the first output voltage Vo1 increases, the LDO regulator 12 starts to operate. The second output transistor Tr2 goes on and outputs the second output voltage Vo2. In this state, the drain voltage Vd of the third transistor Tr3, which functions as a current mirror with the second output transistor Tr2, increases. When the drain voltage Vd exceeds the third reference voltage Vr3, the disconnection comparison signal goes high.

As a result, the AND circuit 19 provides the gate of the first output transistor Tr1 with the PFM signal of the PFM control circuit 18 and starts the switching of the first output transistor Tr1 in accordance with the PFM signal. The first output voltage Vo1 thus gradually decreases from the power supply voltage Vp and converges at a predetermined voltage.

When the load current Io2 decreases, the drain current of the second output transistor Tr2 decreases and the drain current of the third transistor Tr3 decreases. As a result, the drain voltage Vd becomes lower than the third reference voltage Vr3 and the disconnection comparison signal goes low. In this state, the AND output signal goes low and the first output transistor tr1 remains on.

In response to the low disconnection comparison signal, the switch circuit 21 connects the base of the fourth transistor tr4 to the ground GND. Thus, the fourth transistor Tr4 goes off. As a result, the current source control signal CS inactivates the first to third current source circuits 22b–22d and stops the supply of the operational current to the error detection amplifier 15, the PWM comparator 16, and the oscillator 17. Accordingly, the error detection amplifier 15, the PWM comparator 16, and the oscillator 17 do not consume power.

When the load current Io2 increases, the disconnection comparison signal of the control comparator 20 goes high, the error detection amplifier 15, the PWM comparator 16, and the oscillator 17 are activated, and the first output transistor Tr1 starts the switching again.

Figure 7:
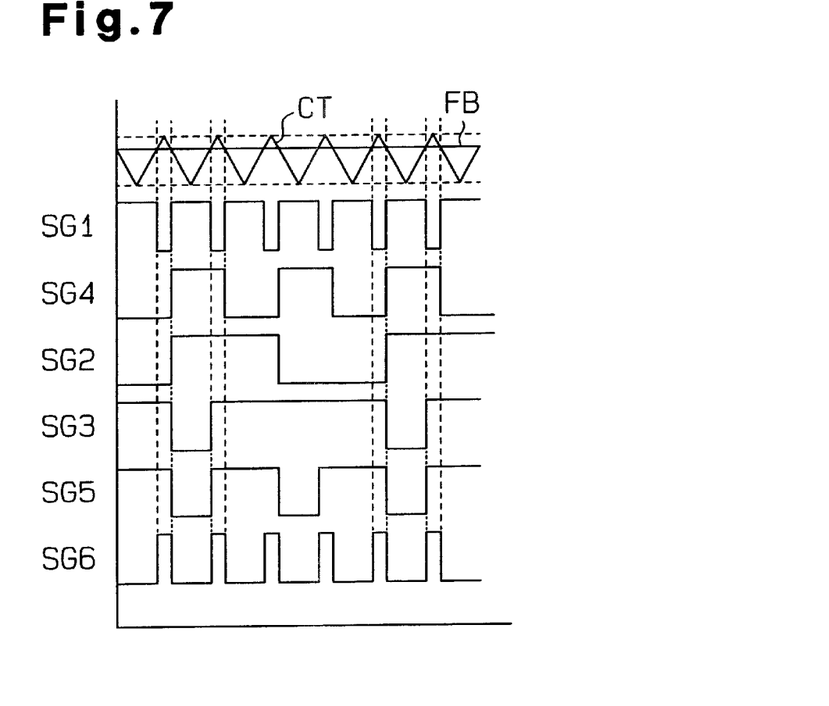
FIG. 7 is a waveform chart illustrating the operations of a PWM comparator and a PFM control circuit used in the DC-DC converter of FIG. 5.
Figure 8:
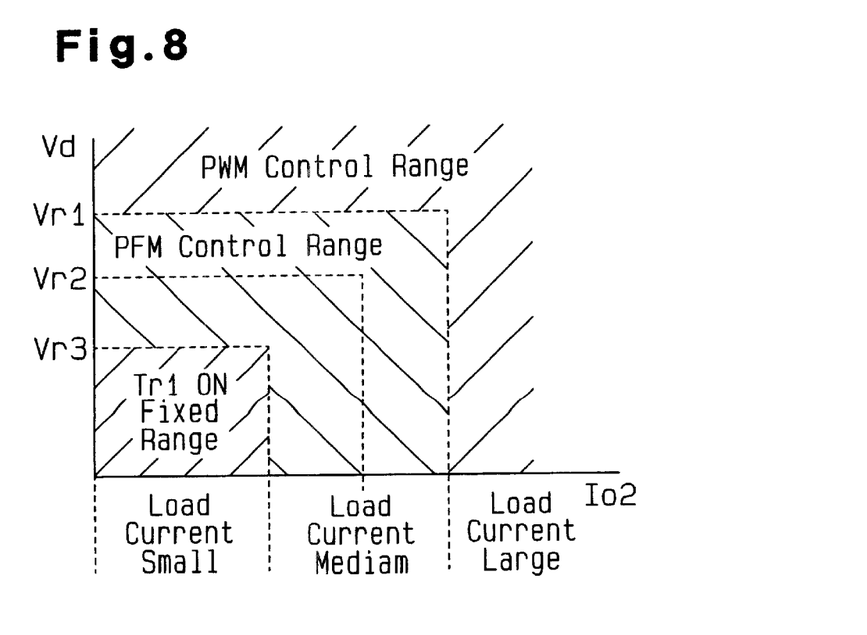
FIG. 8 is an explanatory diagram illustrating the operation of the PWM comparator and the PFM control circuit used in the DC-DC converter of FIG. 5.

FIG. 7 is a waveform diagram and FIG. 8 is an explanatory diagram illustrating the operations of the PWM comparator 16 and the PFM control circuit 18 in the switching control circuit 14. When the load current Io2 decreases and the drain voltage Vd becomes less than the third reference voltage Vr3, the first output transistor Tr1 is fixed in an on state (fixed range in FIG. 8).

When the load current Io2 increases, and the drain voltage Vd becomes greater than the third reference voltage Vr3 but less than the second reference voltage Vr2, the disconnection comparison signal goes high. Thus, the AND circuit 19 provides the PFM signal of the PFM control circuit 18 to the gate of the first output transistor Tr1. In this state, the first and second comparison signals Cm1, Cm2 are both low. In response to the low first and second comparison signals Cm1, Cm2, the PFM control circuit 18 generates a divisional signal SG2, which frequency is one-fourth the frequency of the pulse signal SG1, and generates an output signal (PFM signal) SG3 in response to the divisional signal SG2.

When the load current Io2 further increases, and the drain voltage Vd becomes greater than the second reference voltage Vr2 but less than the first reference voltage Vr1, the disconnection comparison signal is high. Thus, the AND circuit 19 provides the PFM signal to the gate of the first output transistor Tr1. In this state, the second comparison signal Cm2 goes high. In accordance with the low first comparison signal Cm1 and the high second comparison signal, the PFM control circuit 18 generates a divisional signal SG4, which frequency is one-half the frequency of the pulse signal SG1, and generates an output signal (PFM signal) SG5 in response to the divisional signal SG4. When the drain voltage Vd is in the range of Vr3<Vd<Vr1, the switching of the first output transistor Tr1 is controlled by the PFM control circuit 18 (PFM control range in FIG. 8).

As the load current Io2 further increases, and the drain voltage Vd becomes greater than the first reference voltage Vr1, the disconnection comparison signal is high. Thus, the AND circuit 19 provides the PFM signal to the gate of the first output transistor Tr1. In this state, the first and second comparison signals Cm1, Cm2 are high. In accordance with the high first and second comparison signals Cm1, Cm2, the PFM control circuit 18 inverts the pulse signal SG1 and generates an inverted pulse signal SG6. When the drain voltage Vd becomes higher than the first reference voltage Vr1, the switching of the first output transistor Tr1 is controlled by the PFM control circuit 18 (PWM control range in FIG. 8).

In the second embodiment, the switching control circuit 14, the first and second comparators 13a, 13b of the LDO regulator 12, and the stop control circuit 25 are formed on a single semiconductor substrate.

The power supply circuit 200 of the second embodiment has the advantages described below.

(1) When the power supply circuit 200 starts to receive power, the first output transistor Tr1 of the DC-DC converter 11 remains on, and the first output voltage Vo1 of the DC-DC converter 11 increases substantially at the same time as when the power supply voltage Vp increases. Accordingly, referring to the second embodiment illustrated in FIG. 6, delay time t2, that is, the time from when the power supply voltage Vp increases to when the second output voltage Vo2 of the LDO regulator 12 reaches a predetermined voltage, is shortened. This quickly increases the second output voltage (output voltage of the power supply circuit 200) Vo2.

(2) Referring to the second embodiment illustrated in FIG. 6, when the load current Io2 decreases, the first output transistor Tr1 of the DC-DC converter 11 remains on. In this state, most of the switching control circuit 14 stops functioning although the DC-DC converter 11 continues to generate the first output voltage Vo1. This decreases the total current consumption Icc of the power supply circuit 200.

(3) When the LDO regulator 12 stops functioning due to the control signal CNT, the LDO regulator 12 is supplied with the first output voltage Vo1 although the switching control circuit 14 does not function. Thus, the LDO regulator 12 goes on in a state in which the LDO regulator 12 is supplied with the first output voltage Vo1 (constant power supply voltage Vp). As a result, referring to the second embodiment illustrated in FIG. 6, delay time t4, that is, the time from when the control signal CNT goes high to when the second output voltage Vo2 increases, is shortened. This quickly increases the second output voltage Vo2.

[Third Embodiment]

Figure 9:
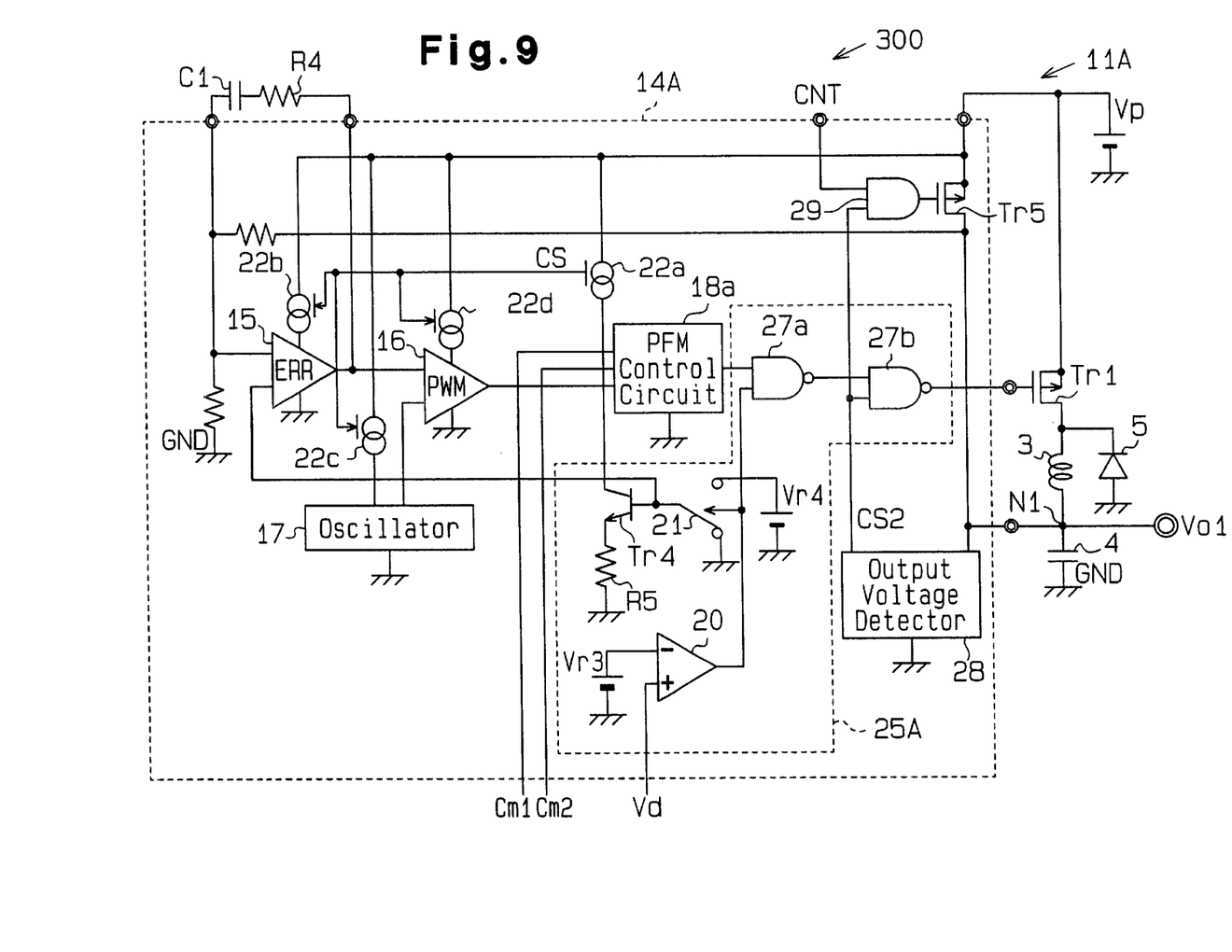
FIG. 9 is a schematic circuit diagram of a DC-DC converter used in a power supply circuit according to a third embodiment of the present invention.

FIG. 9 is a schematic circuit diagram of a DC-DC converter 11A of a power supply circuit according to a third embodiment of the present invention. The power supply circuit 300 of the third embodiment differs from the power supply circuit 200 of the second embodiment only in the switching control circuit of the DC-DC converter.

The power supply circuit 300 includes a DC-DC converter 11A and an LDO regulator 12. The DC-DC converter 11A has a switching control circuit 14A, which includes first and second NAND circuits 27a, 27b, an output voltage detection circuit 28, an AND circuit 29, and a p-channel MOS transistor (auxiliary transistor, fifth transistor) Tr5. A stop control circuit 25A of the third embodiment also includes the first and second NAND circuits 27a, 27b.

The gate of the first output transistor Tr1 is provided with the PFM output signal of the PFM control circuit 18 via the first and second NAND circuits 27a, 27b. The first NAND circuit 27a receives the disconnection comparison signal of the control comparator 20.

The output voltage detection circuit 28 receives the first output voltage Vo1. When the first output voltage Vo1 is less than or equal to a predetermined value and close to the ground level, the output voltage detection circuit 28 generates a second detection signal CS2 at a low level and provides the low second detection signal CS2 to the second NAND circuit 27b and the AND circuit 29.

The AND circuit 29 receives the control signal CNT and generates an AND output signal, which is provided to the gate of the fifth transistor Tr5.

The fifth transistor Tr5 is formed on the same semiconductor substrate as the switching control circuit 14A and has an ON resistance that is greater than that of the first output transistor Tr1. The source of the fifth transistor Tr5 receives the power supply voltage Vp, and the drain of the fifth transistor Tr5 is connected to the first node N1.

The operation of the power supply circuit 300 will now be discussed. In a load circuit supplied with the first output voltage Vo1, if an overcurrent flows through the first output transistor Tr1 when the load becomes excessive for one reason or another and decreases the first output voltage Vo1, the output voltage detection circuit 28 generates the second detection signal CS2 at a low level. In this state, the second NAND output signal goes high regardless of the first NAND output signal, and the first output transistor Tr1 goes off in accordance with the high second NAND output signal. This prevents overcurrent from damaging the first output transistor Tr1.

In response to the low second detection signal CS2, the AND output signal of the AND circuit 29 goes low. In response to the low AND output signal, the fifth transistor Tr5 goes on. A load current is provided to the load circuit from the fifth transistor Tr5. The fifth transistor Tr5 functions as an auxiliary transistor of the first output transistor Tr1. Then, when the first output voltage Vo1 increases and the second detection signal CS2 goes high, the first output transistor Tr1 goes on again and returns to a normal state.

Further, when the power supply circuit 300 starts receiving the power supply voltage Vp, the fifth transistor Tr5 goes on when it is determined that the control signal CNT is low. In this state, the first output transistor Tr1 is also on. Thus, the first output voltage Vo2 quickly increases to the power supply voltage Vp. As a result, the quick increase of the first output voltage quickly activates the LDO regulator 12.

When the control signal CNT goes low and the second output voltage Vo2 of the LDO regulator 12 decreases, the first output transistor Tr1 remains on and the fifth transistor tr5 also remains on. Accordingly, the first output voltage Vo1 quickly increases to the power supply voltage Vp.

In addition to the advantages of the second embodiment, the third embodiment has the advantages described below.

(1) When the power supply circuit 300 starts to receive the power supply voltage Vp, the fifth transistor (auxiliary transistor) Tr5 quickly increases the first output voltage of the DC-DC converter 11A.

(2) When the low control signal CNT causes the LDO regulator 12 to stop functioning, the fifth transistor Tr5 quickly increases the first output voltage of the DC-DC converter 11A to the power supply voltage Vp.

It should be apparent to those skilled in the art that the present invention may be embodied in many other specific forms without departing from the spirit or scope of the invention. Particularly, it should be understood that the present invention may be embodied in the following forms.

Instead of inactivating the first to third current source circuits 22b–22d with the current source control signal CS of the main current source circuit 22a, the error detection amplifier 15, the PWM comparator 16, and the oscillator 17 may be disconnected from the ground GND.

The first to third reference voltages Vr1–Vr3 may be generated by dividing the drain voltage of the third transistor Tr3.

Instead of shifting between PFM control and PWM control, the output frequency of the oscillator 17 may be varied to adjust the switching frequency of the first output transistor Tr1.

The present examples and embodiments are to be considered as illustrative and not restrictive, and the invention is not to be limited to the details given herein, but may be modified within the scope and equivalence of the appended claims.

What is claimed is:

1. A DC-DC converter comprising:
   a voltage generation circuit for receiving a power supply voltage and generating an output voltage, wherein the voltage generation circuit includes an output transistor for performing switching to generate the output voltage;
   a switching control circuit connected to the voltage generation circuit for controlling the switching of the output transistor;
   a current detection circuit connected to the voltage generation circuit for detecting a load current derived from the output voltage of the voltage generation circuit to generate a detection signal; and
   a stop control circuit connected to the voltage generation circuit, the switching control circuit, and the current detection circuit for maintaining the output transistor in an activated state and stopping the operation of the switching control circuit in accordance with the detection signal when the load current is less than or equal to a predetermined value.

2. The DC-DC converter according to claim 1, wherein the stop control circuit includes:
   a control comparator for comparing the detection signal with a reference voltage to generate a comparison signal;
   a gate control circuit connected to the control comparator for maintaining the output transistor in the activated state in accordance with the comparison signal; and
   a power supply disconnection circuit connected to the control comparator for disconnecting the switching control circuit from a power supply in accordance with the comparison signal.

3. The DC-DC converter according to claim 2, wherein the switching control circuit includes:
   an oscillator for generating a reference signal having a predetermined frequency;
   an error detection amplifier for generating an error amplification signal with the output voltage;
   a PWM comparator connected to the oscillator and the error detection amplifier for generating a pulse signal in accordance with the reference signal and the error amplification signal;
   a PFM control circuit connected to the PWM comparator for generating a switching signal to control the switching of the output transistor in accordance with the pulse signal;
   a first current source circuit connected to the error detection amplifier for supplying the error detection amplifier with operational current;
   a second current source circuit connected to the oscillator for supplying the oscillator with operational current; and a third current source circuit connected to the PWM comparator for supplying the PWM comparator with operational current;

wherein the power supply disconnection circuit inactivates the first, second, and third current source circuits in accordance with the comparison signal.

4. A power supply circuit comprising:
   a DC-DC converter for receiving a power supply voltage and generating a first output voltage, wherein the DC-DC converter includes;
      a voltage generation circuit having a first output transistor, wherein the first output transistor performs switching, and the voltage generating circuit generates the first output voltage in accordance with the switching of the first output transistor; and
      a switching control circuit connected to the voltage generation circuit for controlling the switching of the first output transistor;
   a voltage regulator connected to the DC-DC converter for generating the second output voltage in accordance with the first output voltage;
   a current detection circuit for detecting a load current derived from the second output voltage of the voltage generation circuit to generate a first detection signal in accordance with the detected load current; and
   a stop control circuit connected to the voltage generation circuit, the switching control circuit, and the current detection circuit for maintaining the output transistor in an activated state and stopping the operation of the switching control circuit in accordance with the first detection signal when the load current is less than or equal to a predetermined value.

5. The power supply circuit according to claim 4, wherein the voltage regulator includes:
   a second output transistor for generating the second output voltage in accordance with the first output voltage; and
   wherein the current detection circuit includes:
      a current detection transistor connected to the second output transistor for functioning as a current mirror with the second output transistor; and
      a conversion resistor connected to the current detection transistor for converting an output current of the current detection transistor to a voltage and generating the first detection signal which has the converted voltage.

6. The power supply circuit according to claim 4, wherein the stop control circuit includes:
   a control comparator for comparing the detection signal with a reference voltage to generate a comparison signal;
   a gate control circuit connected to the control comparator for maintaining the first output transistor in an activated state in accordance with the comparison signal; and
   a power supply disconnection circuit connected to the control comparator for disconnecting the switching control circuit from a power supply in accordance with the comparison signal.

7. The power supply circuit according to claim 6, wherein the switching control circuit includes:
   an oscillator for generating a reference signal having a predetermined frequency;
   an error detection amplifier for generating an error amplification signal with the first output voltage;
   a PWM comparator connected to the oscillator and the error detection amplifier for generating a pulse signal in accordance with the reference signal and the error amplification signal;
   a PFM control circuit connected to the PWM comparator for generating a switching signal to control the switching of the first output transistor in accordance with the pulse signal;
   a first current source circuit connected to the error detection amplifier for supplying the error detection amplifier with operational current;
   a second current source circuit connected to the oscillator for supplying the oscillator with operational current; and
   a third current source circuit connected to the PWM comparator for supplying the PWM comparator with operational current;
   wherein the power supply disconnection circuit inactivates the first, second, and third current source circuits in accordance with the comparison signal.

8. The power supply circuit according to claim 7, wherein the PFM control circuit shifts states in accordance with the first detection signal, wherein the PFM control circuit shifts between a state in which the PFM control circuit changes a switching frequency of the first output transistor and a state in which the PFM control circuit PWM controls the first output transistor in response to a PWM output signal of the PWM comparator.

9. The power supply circuit according to claim 8, wherein the voltage regulator includes the current detection circuit.

10. The power supply circuit according to claim 4, wherein the voltage regulator inactivates the second output transistor in response to a control signal.

11. The power supply circuit according to claim 10, wherein the switching control circuit includes an auxiliary transistor that functions in parallel to the first output transistor in response to the control signal.

12. The power supply circuit according to claim 11, wherein the switching control circuit further includes:
   an output voltage detection circuit for generating a second detection signal when the first output voltage is less than or equal to a predetermined value; and
   a gate control circuit connected to the output voltage detection circuit for inactivating the first output transistor in accordance with the second detection signal;
   wherein the auxiliary transistor is activated in accordance with the second detection signal to generate the first output voltage when the first output transistor is inactivated.

13. The power supply circuit according to claim 11, wherein the switching control circuit is formed on a single semiconductor substrate, and the auxiliary transistor has an ON resistance that is greater than that of the first output transistor.

14. A method for controlling a DC-DC converter, wherein the DC-DC converter includes an output transistor for performing switching to generate an output voltage and a switching control circuit connected to the voltage generation circuit for controlling the switching of the output transistor, the method comprising the steps of:
   supplying a load with a load current derived from the output voltage of the output transistor;
   detecting the load current;
   determining whether the load current is less than or equal to a predetermined value;
   maintaining the output transistor in an activated state when the load current is determined as being less than or equal to the predetermined value; and stopping the operation of the switching control circuit when the load current is determined as being less than or equal to the predetermined value.

15. The method according to claim 14, wherein the switching control circuit includes a switching unit for generating a switching signal to switch the output transistor and a current source circuit for supplying the switching unit with current; and wherein the stopping step includes inactivating the current source circuit.

16. A method for controlling a power supply circuit, wherein the power supply circuit includes a DC-DC converter having an output transistor for performing switching to generate a first output voltage and a switching control circuit for controlling the switching of the output transistor, and a voltage regulator connected to the DC-DC converter for generating a second output voltage in accordance with the first output voltage, the method comprising the steps of:

supplying a load with a load current derived from the second output voltage;

detecting the load current;

determining whether the load current is less than or equal to a predetermined value;

maintaining the output transistor in an activated state when the load current is determined as being less than or equal to the predetermined value; and stopping the operation of the switching control circuit when the load current is determined as being less than or equal to the predetermined value.

17. The method according to claim 16, wherein the switching control circuit includes a switching unit for generating a switching signal to switch the output transistor and a current source circuit for supplying the switching unit with current; and wherein the stopping step includes inactivating the current source circuit.

18. The DC-DC converter according to claim 2, wherein the switching control circuit includes:

an error detection amplifier;

a PWM comparator;

an oscillator;

a PFM control circuit; and a current source circuit for supplying the error detection amplifier, the PWM comparator and the oscillator with an operational current, wherein the power supply disconnection circuit inactivates the current source circuit.

19. A DC-DC converter comprising:

a voltage generation circuit for receiving a power supply voltage and generating an output voltage, wherein the voltage generation circuit includes an output transistor for performing switching to generate the output voltage;

a switching control circuit connected to the voltage generation circuit for controlling the switching of the output transistor;

a current detection circuit connected to the voltage generation circuit for detecting a load current derived from the output voltage generation circuit to generate a detection signal; and a stop control circuit connected to the voltage generation circuit, the switching control circuit, and the current detection circuit for fixing the output transistor in an activated state and stopping the operation of the switching control circuit in accordance with the detection signal, wherein the switching control circuit switches between a first control performing PEM-control of the output transistor and a second control performing PWM-control of the output transistor in accordance with the detection signal.

\* \* \* \* \*